US009158916B2

(12) United States Patent
Nemiroff et al.

(10) Patent No.: US 9,158,916 B2
(45) Date of Patent: Oct. 13, 2015

(54) UNAUTHORIZED ACCESS AND/OR INSTRUCTION PREVENTION, DETECTION, AND/OR REMEDIATION, AT LEAST IN PART, BY STORAGE PROCESSOR

(71) Applicant: Intel Corporation, Santa Clara, CA (US)

(72) Inventors: Daniel Nemiroff, Folsom, CA (US); Paul J. Thadikaran, Rancho Cordova, CA (US); Paritosh Saxena, Portland, OR (US); Nicholas D. Triantafillou, Portland, OR (US); Andrew H. Gafken, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 13/995,244

(22) PCT Filed: Oct. 17, 2012

(86) PCT No.: PCT/US2012/060629
§ 371 (c)(1),
(2) Date: Jun. 18, 2013

(87) PCT Pub. No.: WO2014/062178
PCT Pub. Date: Apr. 24, 2014

(65) Prior Publication Data
US 2014/0109170 A1    Apr. 17, 2014

(51) Int. Cl.
*G06F 21/00* (2013.01)
*G06F 21/55* (2013.01)

(52) U.S. Cl.
CPC .................................. *G06F 21/55* (2013.01)

(58) Field of Classification Search
CPC combination set(s) only.
See application file for complete search history.

(56) References Cited

U.S. PATENT DOCUMENTS

| 7,519,993 B2 * | 4/2009 | Hasegawa et al. .............. 726/21 |
| 2009/0249075 A1 | 10/2009 | De Atley et al. |
| 2009/0300753 A1 * | 12/2009 | Lin et al. .......................... 726/16 |
| 2010/0332813 A1 | 12/2010 | Rothman et al. |

(Continued)

FOREIGN PATENT DOCUMENTS

EP          1225512 A1     7/2002

OTHER PUBLICATIONS

International Search Report and Written Opinion for PCT Application No. PCT/US2012/060629, Mailed on Feb. 8, 2013, 9 pages.

(Continued)

*Primary Examiner* — Ghazal Shehni
(74) *Attorney, Agent, or Firm* — Christopher K. Gagne (57) ABSTRACT

An embodiment may include a storage processor that may be comprised, at least in part, in a host. The host may include at least one host central processing unit (CPU) to execute at least one host operating system (OS). The storage processor may execute at least one operation in isolation from interference from and control by the at least one host CPU and the at least one host OS. The at least one operation may facilitate, at least in part: (1) prevention, at least in part, of unauthorized access to storage, (2) prevention, at least in part, of execution by the at least one host CPU of at least one unauthorized instruction, (3) detection, at least in part, of the at least one unauthorized instruction, and/or (4) remediation, at least in part, of at least one condition associated, at least in part, with the at least unauthorized instruction.

22 Claims, 4 Drawing Sheets

(56) References Cited

U.S. PATENT DOCUMENTS

2011/0023084 A1    1/2011    Kraemer
2012/0254982 A1    10/2012   Sallam

OTHER PUBLICATIONS

Information Technology—Protected Area Run Time Interface Extension Services, T13, D1367, Revision 3, ANSI NCITS.***—200x Printed Sep. 30, 2000, 31 pages.

Gupta, et al., "Hidden Disk Areas: HPA and DCO", International Journal of Digital Evidence, Fall 2006, vol. 5, Issue 1, pp. 1-8.

TCG Storage Security Subsystem Class: Opal, TCG Copyright, Specification Version 1.0, Revision 1.0, Jan. 27, 2009, pp. 1-81.

Information Technology—AT Attachment with Packet Interface—5 (ATA/ATAPI-5), T13, 1321D, Revision 3, ANSI NCITS.***—xxxx Printed Jun. 16, 2000, 397 pages.

* cited by examiner

UNAUTHORIZED ACCESS AND/OR INSTRUCTION PREVENTION, DETECTION, AND/OR REMEDIATION, AT LEAST IN PART, BY STORAGE PROCESSOR

FIELD

This disclosure relates to the preventing, detecting, and/or remediating, at least in part, by a storage processor, of unauthorized storage access and/or unauthorized instruction execution.

BACKGROUND

In one convention system, a host central processing unit (CPU) in a host executes an anti-malware software program that is (ideally) intended to detect the presence of malicious program code in the host and/or arriving at the host from a network, and to prevent and counteract the deleterious effects of such malicious program code on the host. In actual implementation, however, such anti-malware software suffers from significant disadvantages and drawbacks that may prevent the software from achieving these ideally intended results.

For example, when, in the course of attempting to perform its above duties, such software interacts with a device in the host, there can be little to no confidence that the software actually is interacting with that device, and not with a malicious program executing in the host that is attempting to spoof the anti-malware software (e.g., by exploiting a "man in the middle" attack strategy). This may result in the malicious program being able to carry out its activities without being detected or counteracted by the anti-malware software. Additionally, for these and/or other reasons, the anti-malware software may be incapable of detecting and preventing unauthorized access by the malicious program to the host device.

Also, anti-malware software typically saves critical malware detection and recovery information in a password-protected, storage partition. Unfortunately, a malicious program may be able to snoop the provision of the password by the anti-malware software. This may permit the malicious program to be able to access the partition and to modify the information stored in partition. This may permit the malicious program to be able to change (and/or to prevent the effective updating of) the information in such a way as to prevent the anti-malware software from being able to detect and/or remedy the malicious program. Additionally, such anti-malware software typically is incapable of detecting and/or remedying presence of such a malicious program in a host protected area (HPA, e.g., compatible and/or in compliance with American National Standards Institute (ANSI), Information Technology—AT Attachment 8—ATA/ATAPI Command Set (ATA8-ACS), INCITS 452-2009 and/or other versions of this ANSI standard) in storage.

Additionally, some malicious programs are so tenacious and destructive that only certain specialized techniques are able to remove them, while still permitting recovery the user data, without substantial risk of continued infection. For example, one common technique to remove such malicious programs involves performing a complete wipe of host storage, and to reinstall the host operating system from a known uninfected recovery disk. Unfortunately, as a direct consequence of this technique, user data in the host storage is erased. Also unfortunately, depending upon the particular malicious program involved, it is possible that the malicious program may remain in the storage and may be reactivated at a future time. Further unfortunately, depending upon the number of operating system updates that have occurred since the time when the recovery disk was produced, the recovery disk may not contain program code that is capable of detecting or remedying the particular malicious program present in the host.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:
FIG. 4 illustrates elements in an embodiment.
 Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
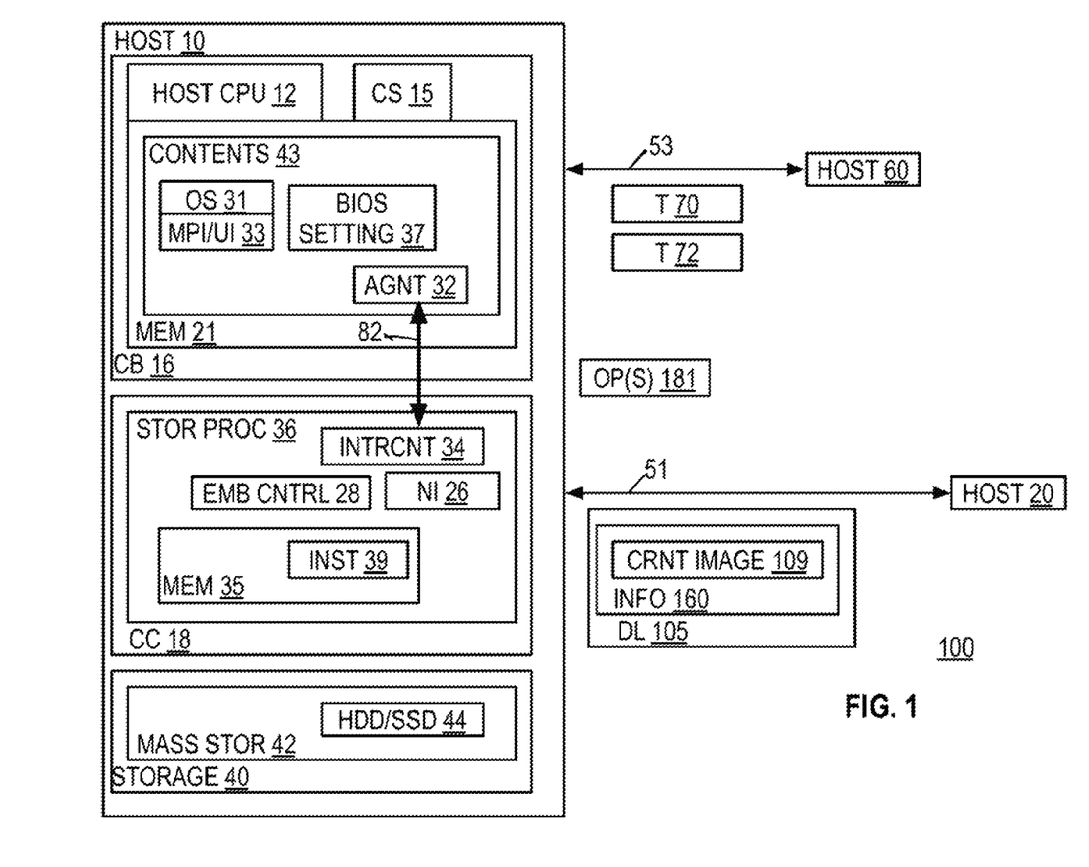
FIG. 1 illustrates elements in an embodiment.

FIG. 1 illustrates a system embodiment 100. System 100 may include one or more hosts 10, one or more hosts 60, and/or one or more hosts 20. Each of these hosts 10, 20, and/or 60 may be geographically remote from each other, at least in part, or alternatively, may be comprised, at least in part, in one or more common housings and/or chassis (not shown). One or more hosts 10 may be communicatively coupled via one or more networks and/or communication links (collectively or singly referred to by numeral 53 in FIG. 1) to one or more hosts 60. Additionally, one or more hosts 10 may be communicatively coupled via one or more networks and/or communication links (collectively or singly referred to by numeral 51 in FIG. 1) to one or more hosts 20.

In this embodiment, the terms "host computer," "host," "server," "node", and/or "device" may be used interchangeably, and may mean, for example, one or more end stations, smart phones, tablet computers, appliances, intermediate stations, network interfaces, clients, servers, storage, mass storage, and/or components and/or portions thereof. In this embodiment, a "network," "channel", "communication link," and/or "communication lane" may be used interchangeably, and may be or may comprise any virtual, physical, and/or logical mechanism, instrumentality, modality, and/or portion thereof (including, for example, without limitation, one or more wired and/or wireless networks and/or one or more portions thereof) that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" means a network that permits, at least in part, at least two entities to be wirelessly communicatively coupled, at least in part. In this embodiment, a "wired network" means a network that permits, at least in part, at least two entities to be communicatively coupled, at least in part, via non-wireless means, at least in part. In this embodiment, data may be or comprise one or more commands (for example one or more program instructions), and/or one or more such commands may be or comprise data. Also in this embodiment, an instruction may include data and/or one or more commands. Similarly, in this embodiment, data may include one or more instructions and/or one or more commands.

One or more hosts 10 may comprise one or more circuit boards (CB) 16 (e.g., one or more system motherboards), one or more circuit cards (CC) 18, and/or storage 40. One or more circuit boards 16 may comprise, for example, one or more single and/or multi-core host processor (HP) central processing units (CPU) 12, one or more chipsets (CS) 15, and/or computer-readable/writable host system memory 21. One or more chipsets (which may comprise, e.g., not shown memory and/or input/output controller circuitry) 15 may communicatively couple (and/or be capable of communicatively coupling) one or more host processor CPU 12, memory 21, one or more circuit cards 18, and/or storage 40.

For example, one or more circuit boards 16 may comprise one or more not shown card slot, interconnect, and/or bus interfaces, and one or more circuit cards 18 may comprise one or interconnects 24 that may be electrically and mechanically coupled to the one or more not shown card slot, interconnect, and/or bus interfaces of one or more circuit boards 16. When so electrically and mechanically coupled, one or more circuit cards and/or one or more components thereof) 18 may be communicatively coupled to one or more circuit boards 16 (and/or one or more components thereof) via one or more chipsets 15.

Also, for example, circuit card 18 (and/or one or more components thereof) may be communicatively coupled to storage 40. When one or more circuit cards 18 are electrically and mechanically coupled to one or more circuit boards 16, storage 40 may be communicatively coupled via one or more circuit cards (and/or one or more components thereof) 18 to one or more circuit boards (and/or one or more components thereof).

Alternatively or additionally, without departing from this embodiment, although not shown in the Figures, some or all of the components and/or the functionality of one or more circuit boards 18 may be comprised in, for example, one or more chipsets 15. Many other alternatives are possible without departing from this embodiment.

In this embodiment, one or more machine-readable program instructions may be stored in computer-readable/writable memory 21. In operation of one or more hosts 10, these instructions may be accessed and executed by one or more host processor CPU 12 and/or one or more chipsets 15. When these instructions are so accessed and executed, this may result, at least in part, in system memory contents 43 being executed at least in part by one or more host processor CPU 12 and/or one or more chipsets 15, and/or becoming resident at least in part in memory 21. This may result in one or more host processor CPU 12, one or more chipsets 15, and/or the respective components of memory contents 43 performing the operations described herein as being performed by these and/or other components of host 10. In this embodiment, system memory contents 43 may comprise, for example, one or more one or more host operating systems (OS) 31, one or more host basic input/output system (BIOS) settings 37, and/or one or more software process/program. agents 32. Additionally or alternatively, depending upon the particular operation and/or implementation of host 10, system memory contents 43 may comprise one or more malicious program instructions (MPI) and/or one or more unauthorized instructions (UI). One or more MPI and UI are collectively or singly referred to by numeral 33 in FIG. 1.

In this embodiment, one or more circuit cards 18 may comprise one or more storage processors 36. Storage processor 36 may comprise, for example, one or more interconnects 24, one or more network interface and/or network interface controllers) 26, one or more embedded controllers 28, and/or local (e.g., residing and/or comprised in, at least in part, storage processor 36 and/or one or more circuit cards 18) memory 35.

Local memory 35 may store, at least in part, one or more machine-readable program instructions 35. In operation of storage processor 36, these instructions 35 may be accessed and executed by one or more controllers 28 and/or one or more network interfaces 26. When these instructions are so accessed and executed, this may result, at least in part, in one or more controllers 28 and/or one or more network interfaces 26 performing the operations described herein as being performed by these and/or other components of storage processor 36.

In this embodiment, a portion, subset, or component of an entity may comprise all or less than all of the entity. Also, in this embodiment, an agent, process, program, driver, operating system, and/or application may comprise and/or result at least in part from execution of one or more program instructions. In this embodiment, an unauthorized instruction and/or malicious program instruction may be or comprise one or more instructions whose presence, storage, and/or execution in and/or by a host is undesired and/or has not been authorized by an owner, user, or administrator of the host. Additionally, in this embodiment, BIOS may relate to, for example, one or more firmware and/or software instructions and/or processes that may permit and/or facilitate capabilities related to, at least in part, communication and/or interaction with, control by, and/or input/output (I/O) operations related to one or more users, circuitry, and/or other components and/or devices. In this embodiment, a BIOS may be separate from an OS. However, without departing from this embodiment, one or more portions of a BIOS may comprise, at least in part, and/or be comprised in, at least in part, one or portions of an OS, or vice versa. In this embodiment, system memory 21, local memory 35, and/or storage 40 each may comprise one or more of the following types of memories: semiconductor firmware memory, programmable memory, non-volatile memory, mass storage, read only memory, electrically, programmable memory, random access memory, flash memory, magnetic disk memory, optical disk memory, and/or other or later-developed computer-readable and/or writable memory.

Storage 40 may comprise, for example, mass storage 42 that may comprise one or more hard disk drives and/or solid state drives (collectively or singly referred to by numeral 44). In this embodiment, storage 40 may be or comprise circuitry, and/or other components and/or devices that may be capable, at least in part, of storing data. Also, in this embodiment, mass storage 42 may be or comprise storage that is capable of non-volatile storage of data, and/or from which such data stored therein may be retrieved. Additionally, in this embodiment, a hard disk drive and/or fixed disk drive may be or comprise, for example, one or more platters and/or disks (and/or other circuitry) to and/or from which data may be electrically and/or magnetically stored and/or retrieved, at least in part. Furthermore, in this embodiment, a solid state drive may be or comprise, for example, one or more flash and/or phase-change memory devices and/or other circuitry) to and/or from which data may be stored and/or retrieved, at least in part. Although not shown in the Figures, storage 40, mass storage 42 and/or drive 44 may comprise one or more host bus adapters. Also, although not shown in the Figures, storage 40, mass storage 42, and/or drive 44 may comprise multiple devices that may be compatible with, at least in part, one more respective communication and/or storage protocols that may differ from each other, at least in part.

As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. In this embodiment, an embedded controller may be or comprise a controller that is integrated, at least in part, in other circuitry, such as, for example, as one or more circuitry blocks in one or more integrated circuits that may comprise and/or embody other and/or additional circuitry and/or functionality. Also in this embodiment, a chipset may comprise circuitry capable of communicatively coupling, at least in part, one or more host processors, storage, mass storage, one or more nodes, and/or memory.

Although not shown in the Figures, each of the hosts 10, 20, and/or 60 may comprise a respective graphical user interface system. The not shown respective graphical user interface systems may comprise, e.g., respective keyboards, pointing devices, and display systems that may permit one or more human users to input commands to, and monitor the operations of hosts 10, 20, and/or 60.

Depending upon, for example, the particular embodiment, one or more hosts 20 and/or 60 may comprise, in whole or in part, respective components that may correspond, at least in part, to the above-described respective components of one or more hosts 10. However, alternatively or additionally, without departing from this embodiment, one or more hosts 20 and/or 60 may comprise, at least in part, respective components and/or functionalities that may differ, at least in part, from respective components and/or functionalities of one or more hosts 10.

In operation, one or more storage processors 36 may be capable of executing, at least part, one or more operations 181 to facilitate, at least in part, (1) the prevention, at least in part, of unauthorized access to the storage 40, (2) the prevention, at least in part, of execution by the one or more host CPU 12, one or more host OS 31, and/or one or more chipsets 15 of one or more unauthorized and/or malicious program instructions 33, (3) detection, at least in part, of the one or more unauthorized and/or malicious program instructions 33, and/or (4) remediation, at least in part, of one or more conditions that may be associated, at least in part, with the one or more unauthorized and/or malicious program instructions 33. In this embodiment, one or more storage processors 36 may execute (at least in part) these one or more operations 181 in isolation from interference from and/or control by the one or more host CPU 12, one or more host OS 31, and/or one or more chipsets 15.

For example, in this embodiment, one or more embedded controllers 28 of one or more storage processors 36 may be capable, at least in part, of governing, controlling, and/or restricting access to and/or from storage 40, network communication links 53 and/or 51, and/or memory 21. Additionally, one or more embedded controllers 28 may be capable, at least in part, of unrestrictedly (and/or exclusively directly) accessing storage 40, network communication links 53 and/or 51, and/or memory 21. One or more controllers 28 may be capable of intercepting, at least in part, any attempt to access the storage 40, memory 21, and/or links 51 and/or 53 from and/or by one or more CPU 12, one or more chipsets 15, one or more OS 31, and/or other entities within and/or external to one or more hosts 10 (e.g., other software and/or hardware within one or more hosts 10 and/or one or more network entities external to one or more hosts 10 by accessible via one or more links 51 and/or 53). One or more controllers 28 may either permit, at least in part, or prevent (e.g., block), at least in part, execution of respective intercepted access attempts, depending upon whether one or more policies (e.g., anti-malware policies) indicate that such respective intercepted access attempts should be allowed to proceed to be executed, or conversely, should be prohibited. Additionally, one or more controllers 28 may be capable, at least in part, of scanning (e.g., examining) contents of the memory 21 and/or storage 40, and/or all network traffic received by and/or to be transmitted from one or more hosts 10, in order to detect whether such contents and/or traffic may contain and/or comprise one or more unauthorized and/or malicious program instructions. One or more storage processors 36 and/or one or more controllers 28 may be capable, at least in part, of carrying out its foregoing and/or other operations independently and/or without interference from, and/or without being subject to control and/or inspection by, one or more host CPU 12, one or more OS 31, and/or one or more chipsets 15. For example, local memory 35 and/or one or more instructions 39 may be fully hidden and/or isolated from access and/or control by one or more host CPU 12, one or more OS 31, one or more chipsets 15, and/or any program instructions executed in one or more host CPU 12, one or more OS 31, and/or one or more chipsets 15. Thus, one or more host CPU 12, one or more OS 31, and/or one or more chipsets 15 may be incapable of accessing one or more storage processors 36 (and/or any components of one or more storage processors 36), and also may be incapable of controlling, interfering with, and/or monitoring any of the foregoing and/or other operations of one or more storage processors 36 and/or of the components of one or more storage processors 36.

In this embodiment, accessing storage or memory may comprise one or more operations that may comprise, at least in part, one or more read operations and/or one or more write operations involving, at least in part, the storage or memory. In this embodiment, accessing a communication link may comprise one or more operations that may comprise, at least in part, transmitting data to and/or via, and/or receiving data from and/or via, the communication link.

In this embodiment, one or more hosts 20 may be or comprise, at least in part, one or more secure and/or trusted administrative servers that may be capable of providing information 160 that may include, for example, updated malware/malicious program instruction/unauthorized instruction definitions and/or signatures, program instructions that may facilitate and/or involve their use, at least in part, and/or program instructions that may facilitate execution of one or more operations 181. Also in this embodiment, one or more hosts 60 may be or comprise one or more untrusted and/or unsecure servers.

One or more embedded controllers 28 may communicate with one or more hosts 20 via one or more network interfaces 26 (and one or more links 51) to facilitate, at least in part, one or more operations 181. This communication with one or more hosts 20 may be carried out in such a manner as to be isolated, at least in part, from host CPU traffic (e.g., network communications destined for and/or originating from, at least in part, one or more host CPU 12) 70 and/or host OS traffic (e.g., network communications destined for and/or originating from, at least in part, one or more host OS 31), propagated via one or more links 53, involving one or more hosts 60. As part of the communication of one or more controllers 28 and/or one or more storage processors 36 with one or more hosts 20, the one or more storage processors 36 and/or embedded controllers 28 may request and/or receive, at least in part, one or more downloads 105 from one or more hosts 20 that may comprise, at least in part, information 160. Advantageously, this may permit the one or more embedded controllers 28 and/or storage processors 36 to be able to receive (in a secure and trusted manner that is independent and isolated from interference, control, tampering, and/or modification by one or more host CPU 12, chipsets 15, and/or host OS 31) updated and/or specialized information and/or program instructions to facilitate, for example, the detection, prevention, and/or remediation of one or more malicious program and/or unauthorized instructions 33. Further advantageously, the information 160 may be the latest such information that may be capable of being obtained, and this may make it possible to decrease the time involved with suppressing, remedying, and/or eliminating threats posed by such instructions 33.

Also, for example, one or more controllers 28 and/or storage processors 36 may be capable of establishing, at least in part, one or more protected and/or hidden partitions in storage 40 (e.g., protected from access and/or hidden from one or more host CPU 12, chipsets 15, host OS 31, and/or instructions 33) in which to store, at least in part, information 160, and/or for other and/or additional purposes. Additional features of this embodiment may include, for example, the capability of the one or more controllers 28 and/or storage processors 36 to establish, at least in part, one or more secure and/or trusted communication channels 82 with one or more agents 32 to facilitate secure and/or trusted prevention, detection, and/or remediation of one or more instructions 33 using and/or involving, at least in part, one or more agents 32.

For example, in this embodiment, one or more storage processors 36 and/or controllers 28 may establish, at least in part, one or more trusted and/or secure communication channels 82 with one or more agents 32 to permit trusted and/or secure command and/or data exchange to be carried out between the one or more agents 32 (on one end of the one or more channels 82) and the one or more controllers 28 and/or storage processors 36 (on the other end of the one or more channels 82). This exchange may be related to one or more storage operations (e.g., access operations) to be carried out, at least in part, by the storage 40 (e.g., in order to facilitate and/or implement, at least in part, the one or more operations 181).

For example, the exchange may involve the one or more agents 32 providing to the one or more controllers 28 and/or processors 36 one or more requests that the storage 40 perform one or more storage operations that may facilitate and/or implement, at least in part, one or more operations 181. The one or more controllers 28 and/or processors 36 may examine, at least in part, the one or more requests to determine whether they may be authorized to proceed to be relayed to and/or executed by the storage 40. If one or more controllers 28 and/or processors 36 determine that the one or more requests are on authorized, the one or more controllers 28 and/or processors 36 may issue the one or more requests to the storage 40, and storage 40 may carry out the one or more requests. The results of execution of the one or more requests may be provided from the storage 40 to the one or more controllers 28 and/or processors 36, and thence, may be provided via the one or more channels 82 to the one or more agents 32. One or more agents 32 may use the results in determining, for example, whether one or more instructions 33 may be present in storage 40 and/or actions to take to remedy (e.g., remove) the one or more instructions 33 from the storage 40 if one or more instructions 33 are determined to be present in the storage 40.

For example, in this embodiment, local memory 35, one or more controllers 28, and/or one or more processors 36 may store, at least in part, one or more asymmetric public/private key credentials to be used to establish the one or more channels 82 and/or to attest to the identity and/or to authenticate one or more controllers 28 and/or one or more processors 36. Additionally, in this embodiment, one or more agents 32 may be or comprise one or more trusted anti-malware software agents, and may store, at least in part, one or more asymmetric public/private key credentials to be used to establish the one or more channels 82 and/or to attest to the identity and/or to authenticate one or more agents 32.

One or more agents 32 may issue one or more credentials and one or more public keys of the one or more agents 32 to one or more controllers 28 and/or processors 36. These one or more credentials may be or comprise one or more predetermined values signed using the one or more private keys of the one or more agents 32. One or more controllers 28 and/or processors 36 may verify, using the one or more public keys of the one or more agents 32 and public/private key authentication techniques, the authenticity of the one or more credentials issued by the one or more agents 32. If the one or more controllers 28 and/or processors 36 is unable to determine that the one or more credentials are authentic, communication with the one or more agents 32 is terminated by one or more controllers 28 and/or processors 36 as unauthorized.

Conversely, if the one or more controllers 28 and/or processors 36 determines that the one or more credentials are authentic, one or more controllers 28 and/or processors 36 may issue one or more session keys, one or more credentials, and one or more public keys of one or more controllers 28 and/or processors 36 to one or more agents 32. The one or more session keys may be generated based at least in part upon the one or more public keys of the one or more agents 32 and one or more private keys of the one or more controllers 28 and/or processors 36. The one or more credentials issued by the one or more controllers 28 and/or processors 36 may be or comprise one or more predetermined values signed using the one or more private keys of the one or more controllers 28 and/or processors 36. One or more agents 32 may verify, using the one or more public keys of the one or more controllers 28 and/or processors 36 and public/private key authentication techniques, the authenticity of the one or more credentials issued by the one or more controllers 28 and/or processors 36. If the one or more agents 32 are unable to determine that the one or more credentials are authentic, communication with the one or more controllers 28 and/or processors 36 is terminated by one or more agents 32 as unauthorized. Conversely, if the one or more agents 32 determines that the one or more credentials issued by one or more controllers 28 and/or processors 36 are authentic, one or more agents 32 may establish and/or initiate communications via one or more secure channels 82 that may be based at least in part upon cryptographic techniques that may employ the one or more session keys. The exchange of data and/or commands via one or more channels 82 may thereafter be continued to be securely carried out based upon such techniques based upon the one or more session keys. Respective iterations of the foregoing operations may be carried out to re-establish the one or more session keys and/or secure channels 82 when appropriate (e.g., following a restart of system 100 and/or one or more hosts 10).

Advantageously, by establishing and/or using one or more secure channels 82 for such data and/or command exchange between one or more agents 32 and one or more processors 36 and/or controllers 28, such data and/or command exchange may be protected against "man in the middle" attacks so as to prevent malicious programs (e.g., that may result from execution of one or more instructions 33) from being able to impersonate the identities of the parties to such exchange. This may prevent the malicious programs from being able to read, modify, and/or replay such exchange. It may also prevent such malicious programs from being able to interfere with execution by the storage 40 of the storage requests, and/or with the review of the results of such execution, that may be embodied in such exchange.

In this embodiment, in addition to or as an alternative to being resident in one or more hosts 10, one or more agents 32 may be resident, at least in part, in one or more hosts 20. In this arrangement, one or more secure channels 82 may be established, at least in part, via one or more links 51.

In this embodiment, a first entity may be considered to be trusted and/or secure with respect to and/or by a second entity if the first entity acts in accordance with one or more communication and/or data security policies that may be relied upon (e.g., by the second entity or a user of the second entity) to establish and/or maintain communication and/or data security. Similarly, in this embodiment, communication between a first entity and a second entity may be said to be trusted and/or secure communication if such communication is carried out in accordance with one or more such relied upon communication and/or data security policies.

In this embodiment, the one or more storage processors 36 and/or controllers 28 may intercept, at least in part, attempted access (e.g., via one or more storage access requests 202 in FIG. 2) to (e.g., to write to) and/or from (e.g., to read from) storage 40 by the one or more host CPU 12, host OS 31, and/or chipset 15. The one or more storage processors 36 and/or controllers 28 may establish, at least in part, one or more portions (e.g., one or more partitions 206 in FIG. 2) that may be hidden from and/or inaccessible to the one or more host CPU 12, host OS 31, and/or chipset 15. These one or more portions (e.g., one or more partitions 206) may store, at least in part, information 208 to facilitate, at least in part, one or more operations 181.

Figure 2:
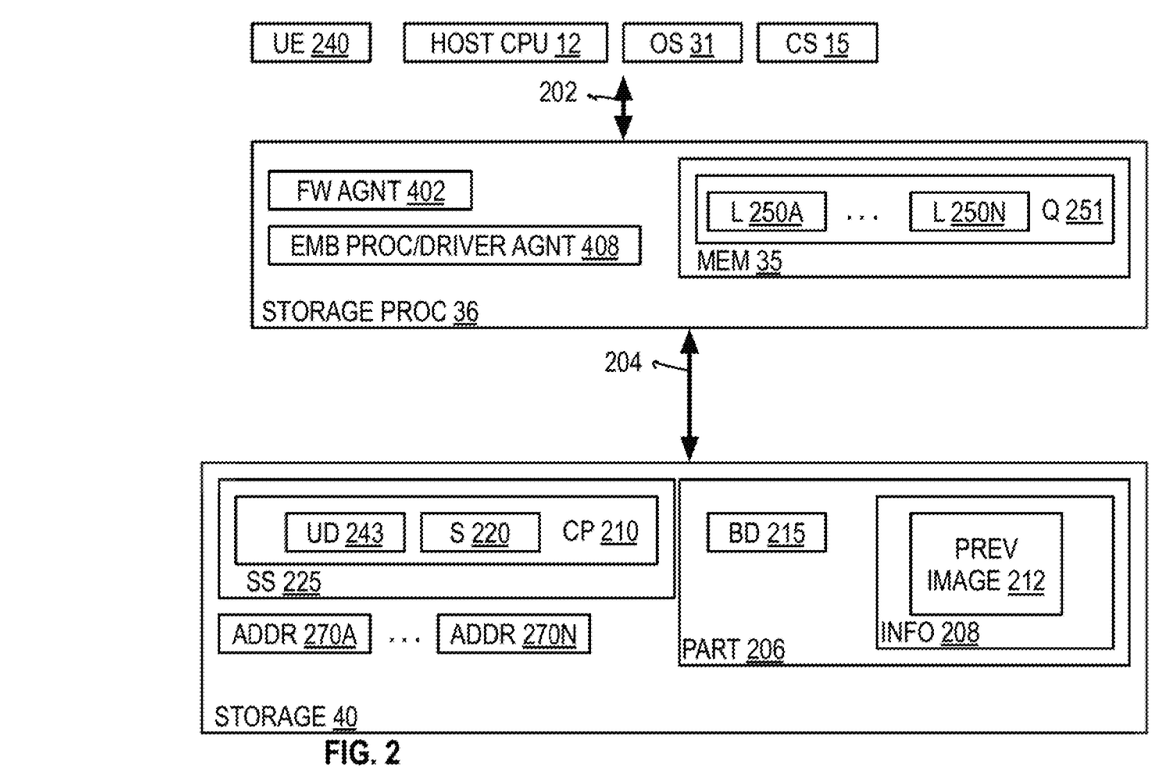
FIG. 2 illustrates elements in an embodiment.

Additionally or alternatively, in this embodiment, one or more storage processors 36 and/or controllers 28 may intercept one or more (and in this embodiment, a plurality of) storage access requests 202, and may store, at least in part and/or at least temporarily, the one or more requests 202 (e.g., in one or more locations 250A . . . 250N in local memory 35). After (and/or contemporaneously with, at least in part) one or more requests 202 have been stored at least in part and/or at least temporarily in one or more locations 250A . . . 250N, the one or more storage processors 36 and/or controllers 28 may examine, at least in part, the thus stored one or more requests 202 to make a determination based at least in part thereupon whether to permit the one or more requests 202 to proceed to be executed, at least in part, by the storage 40. This determination may be based at least in part upon whether the one or more requests 202 may be associated, at least in part, with one or more currently locked addresses 270A . . . 270N in storage 40 and/or one or more unauthorized requesting entities 240 (e.g., one or more entities that may be unauthorized to have made, originated, and/or generated, at least in part, the one or more requests 202. in this embodiment, a memory location or address may be considered to be locked if one or more entities have been (at least temporarily) prohibited access to and/or from the location or address.

For example, in this embodiment, the one or more partitions 206 may be hidden from all entities except, and/or protected from any accesses except those originating from, one or more storage processors 36, controllers 28, and/or agents 32. Accordingly, in this embodiment, the only entities to which one or more partitions 206 may be visible, and/or that may be capable of accessing one or more partitions 206, may be or comprise one or more storage processors 36, controllers 28, and/or agents 32. Following, for example, a restart and/or reboot of one or more hosts 10, the first request that may be issued from one or more agents 32 to storage 40 via one or more secure channels 82 may be to request that one or more partitions 206 be established. In response, at least in part to such first request, one or more storage processors 36 and/or controllers 28 may issue to storage 40 one or more corresponding requests that may result in the establishment and/or maintaining of one or more partitions 206. Alternatively, without departing from this embodiment, one or more storage processors 36 and/or controllers 28 may issue one or more such requests to storage 40 without having been requested to do so by the one or more agents 32.

For example, after one or more channels 82 have been established, at least in part, one or more agents 32 may request, via one or more requests issued via the one or channels 82, that the one or more processors 36 and/or controllers 28 establish, at least in part, one or more partitions 206. These one or more requests may include, indicate, and/or specify (e.g., as one or more parameters) one or more sizes (e.g., in bytes) of the one or more partitions 206. In response, at least in part, to these one or more requests, one or more processors 36 and/or controller 28 may (1) validate, at least in part, the one or more requests and/or parameters (e.g., in accordance with appropriate cryptographic techniques and/or to ensure that they comply with proper syntax and/or actual parameters of the storage 40), and/or (2) issue one or more requests to storage 40 that may result in allocating, partitioning, and/or re-enumerating the storage 40 (and/or one or more drives 44) in accordance with the one or more requests and/or parameters from the one or more agents 32. For example, if the one or more partitions 206 are to be comprised in one or more drives 44, one or more drives 44 have a total size of 120 gigabytes of which 20 gigabytes are available (e.g., free), and 10 gigabytes have been requested for one or more partitions 206, then one or more storage processors 36 and/or controllers 28 may (1) reserve the 10 gigabytes for the one or more partitions 206, and (2) re-partition and/or re-export the one or more drives 44 (e.g., to the one or more host CPU 12, host OS 31, and/or chipset 15) such that only the remaining 110 gigabyte portion of the one or more drives 44 that excludes the 10 gigabytes comprised in the one or more partitions 206) may be visible to and/or accessible by the one or more host CPU 12, host OS 31, and/or chipset 15.

After one or more partitions 206 have been established, one or more agents 32, and/or one or more processors 36 and/or controllers 28 may issue additional secure access requests to one or more partitions 206. In the case of one or more agents 32, this may be via one or more channels 82, and/or one or more processors 36 and/or controllers 28). In the case of one or more processors 36 and/or controllers 28, this may be by directly accessing storage 40.

Additionally, after one or more partitions 206 have been established, one or more processors 36 and/or controllers 28 may intercept and/or selectively filter storage access requests 202 issued from and/or originating from, at least in part, the one or more host CPU 12, host OS 31, and/or chipset 15, in order to establish and/or maintain, at least in part, the integrity and/or security of the one or more partitions 206 (e.g., from unauthorized access requests and/or unauthorized entities 240 issuing such requests 202). For example, after intercepting one or more requests 202 issued from one or more host CPU 12, host OS 31, and/or chipset 15, one or processors 36 and/or controllers 28 may examine (e.g., inspect) the one or more intercepted requests 202 to determine whether one or more intercepted requests 202, if allowed to be executed, would access, at least in part, the one or more partitions 206.

If one or more requests 202 (if allowed to be executed) would access, at least in part, one or more partitions 206, then one or more processors 36 and/or controllers 28 may deny and/or reject (e.g., not allow to be passed on to and/or executed by storage 40), at least in part, one or more requests 202, and may indicate to the one or more entities that issued the one or more requests 202 that the one or more requests 202 have been denied and/or rejected, at least in part. Accordingly, in this case, one or more requests 202 may not be executed, at least in part, by storage 40.

Conversely, if one or more requests 202 (if allowed to be executed) would not access, at least in part, one or more partitions 206, then one or more processors 36 and/or controllers 28 may allow to be passed on to and/or be executed by storage 40, at least in part, one or more requests 202. Accordingly, in this case, one or more requests 202 may be executed, at least in part, by storage 40.

In this embodiment, information 208 may be stored, at least in part, in one or more secure and/or protected partitions 206 that may facilitate, at least in part, one or more operations 181. Advantageously, this may permit such information 208 to be secure from tampering, intrusion, and/or modification by one or more host CPU 12, host OS 31, and/or chipsets 15. Advantageously, this may prevent unauthorized storage access requests and/or unauthorized entities 240 (e.g., malicious programs/processes executed by one or more host CPU 12, host OS 31, and/or chipsets 15) from being able to access, tamper with, modify, and/or corrupt one or more partitions 206 and/or information 208. Further advantageously, one or more anti-malware agents 32 may be capable of securely accessing one or more partitions 206 and/or information 208 in a manner that is invulnerable to Observation, tampering, interception, and/or modification by one or more host CPU 12, host OS 31, chipsets 15, and/or unauthorized entities 240.

This may also be used to advantage in the event that one or more hosts 10 become infected by one or more unauthorized entities 240 (e.g., as a result, at least in part, of one or more host CPU 12, host OS 31, and/or chipsets 15 executing one or more malicious/unauthorized instructions 33). For reasons that will become apparent, these advantages may be even greater if the one or more unauthorized entities 240 and/or instructions 33 are of a particularly malicious and/or destructive variety (e.g., that may prevent booting to an already installed OS, and/or whose remediation may involve OS and/or user data recovery operations).

For example, one or more controllers 28 and/or processors 36 may periodically examine (e.g., scan) memory 21 and/or storage 40 to determine whether one or more malicious and/or unauthorized program instructions 33 (and/or one or more unauthorized entities 240 resulting, at least in part, from execution thereof by one or more host CPU 12, host OS 31, and/or chipsets 15) may be present, at least in part, in memory 21 and/or storage 40. In this embodiment, if one or more such instructions 33 and/or entities 240 are present in memory and/or in a partition of storage 40, the memory and/or partition may be referred to as being corrupted (at least in part).

By way of example, in response, at least in part, to detection, at least in part, by one or more processors 36 and/or controllers 28 of one or more corrupted partitions (e.g., one or more corrupted partitions 210) of storage 40, one or more storage processors 36 and/or controllers 28 may perform one or more network downloads 105 of information 160 that may comprise one or more current OS recovery images 109. One or more images 109 may be used to update, at least in part, with a later (or the most recent, current) OS version, one or more previously stored OS recovery images 212 that may be comprised, at least in part, in information 208. Also in response at least in part to such detection, one or more controllers 28 and/or processors 36 may establish, at least in part, one or more boot devices 215 in one or more partitions 206, based at least in part upon one or more current OS recovery images 109. One or more processors 36 and/or controllers 28 may issue, in response at least in part to such detection, one more commands to one or more host CPU 12 and/or chipsets 15 that may result, at least in part, in one or more host CPU 12 rebooting the one or more hosts 10 from and/or based at least in part upon one or more boot devices 215 and/or current recovery images 109. For example, as the one or more host CPU 12 reboot, one or more requests for boot information from one or more host CPU 12 may be received and/or intercepted by, at least in part, one or more processors 36 and/or controllers 28. In response to these one or more boot information requests, one or more processors 36 and/or controllers 28 may provide and/or direct the one or more host CPU 12 to the current recovery image 109 from one or more boot devices 215. One or more host CPU 12 may reboot one or more hosts 10 based upon and/or from, at least in part, such current recovery image 109 from one or more boot devices 215. As a result, at least in part, of such rebooting, the current OS recovery image 109 may be installed in host memory 21 and/or executed by one or more host CPU 12.

During, and/or in response, at least in part, to the rebooting, at least in part, from and/or based at least in part upon one or more boot devices 215, one or more current OS recovery images 109 may obtain from one or more hosts 20 the most current and/or up-to-date virus and/or malware detection and/or recovery tools, including the most current and/or up-to-date virus/malware signatures and/or instructions to remedy the particular attack embodied in the one or more corrupted partitions 210. The one or more current OS recovery images 109 may (1) mount, at least in part, the one or more corrupted partitions 210 as secondary storage 225, (2) determine, at least in part, and/or remedy, at least in part, one or more sources (e.g., malicious instructions 33 and/or entity 240) 220 of the corruption of the one or more corrupted partitions 210, and/or (3) obtain, via the one or more and/or other) network downloads comprised in downloads 105, additional information to facilitate, at least in part, recovery of user data 243 from the one or more corrupted partitions 210. In this embodiment, advantageously, the most current and/or up-to-date virus and/or malware detection and/or recovery tools obtained by one or more current OS recovery images 109 and/or such additional information may permit the corruption to be remedied without having reformat and/or erase the storage 40, and/or may permit the user data 243 to be recovered without substantial loss of such data 243.

Alternatively or additionally, without departing from this embodiment, the boot image information of the boot drive 215 may be downloaded, at least in part, and stored, at least in part, in a removable medium (e.g., thumb flash drive). Also alternatively or additionally, such boot image information may be downloaded to a not shown partition in storage 40 that is not hidden or protected from access by one or more host CPU 12, and/or to different, not shown hidden partition in other not shown storage in one or more hosts 10.

Figure 4:
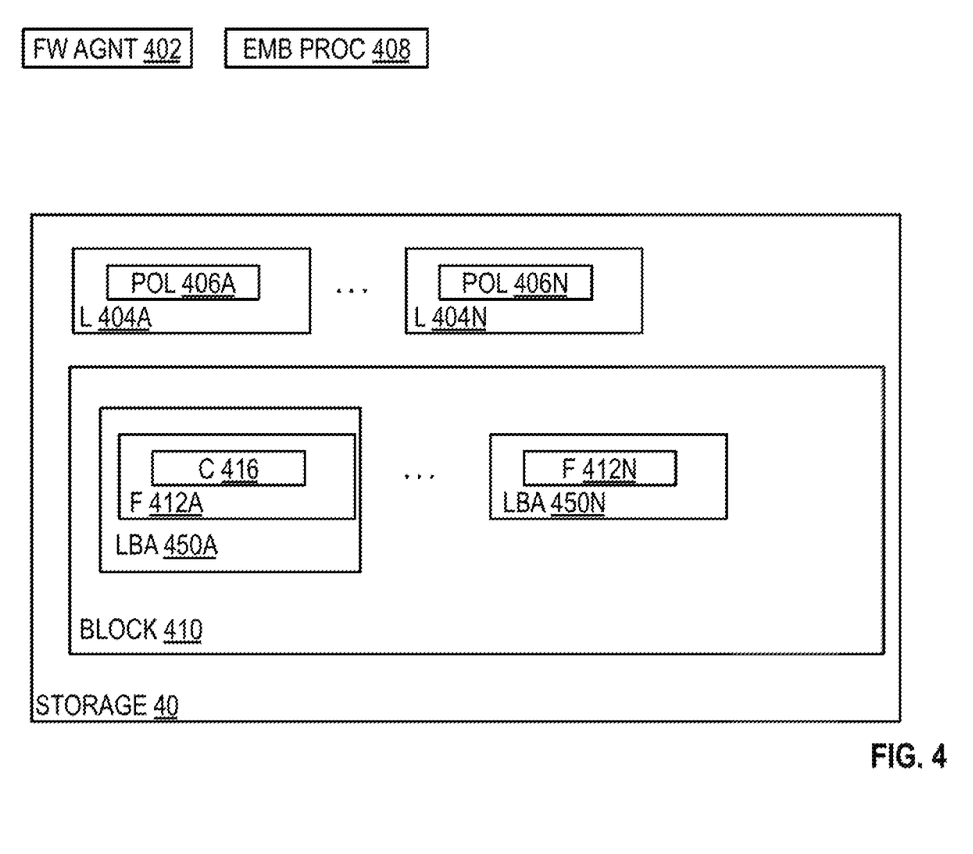

As stated previously, one or more storage processors 36 and/or controllers 28 may intercept and store, at least temporarily, in one or more locations 250A . . . 250N in local memory 35, one or more storage access requests 202 from the one or more host CPU 12, host OS 31, and/or chipset 15. One or more storage processors 36 and/or controllers 28 may examine, at least in part, the thus stored one or more requests 202 to determine whether to permit the one or more requests 202 to proceed to execution by the storage 40. This determination may be based at least in part upon whether the one or more requests 202 may be associated, at least in part, with one or more currently locked addresses 270A ... 270N in storage 40 and/or one or more unauthorized requesting entities 240 (e.g., one or more entities that may be unauthorized to have made, originated, and/or generated, at least in part, the one or more requests 202. In this embodiment, these operations may permit one or more storage processors 36 and/or controllers 28 (and/or one or more entities executed, at least in part, by them, e.g., one or more embedded firmware storage drivers 402 and/or drivers 408) to be able to issue one or more storage access requests 204 involving one or more locations in the storage 40 that may be the same, at least in part, as those involved with one or more storage access requests 202, without resulting (at least substantially) in coherency and/or contention issues.

For example, one or more storage processors 36 and/or controllers 28 may be executed, at least in part, one or more firmware agents 402 and/or embedded processes and/or drivers 408. One or more firmware agents 402 may intercept, at least in part, one or more requests 202. Before one or more requests 202 may be permitted by one or more firmware agents 402 to be executed, at least in part, by storage 40, may determine whether the one or more requests 202, if executed, would result in coherency and/or contention issues with respect to any access request issued by one or more processors 36 and/or controllers 28 that is currently being executed and/or that might be executed contemporaneously, at least in part, with one or more requests 202. At least two types of locking techniques may be implemented, at least in part, by one or more firmware agents 402 in order to accomplish this, at least in part.

In one of these locking techniques, one or more access requests may be placed, at least in part, in one or more lock queues (251, e.g., comprising one or more locations 250A ... 250N) in memory 35 if the one or more access requests involve accessing one or more locked logical block addresses (LBA, e.g., one or more addresses 270A ... 270N) in storage 40. In this technique, as and/or after they are intercepted by one or more firmware agents 402, one or more firmware agents 402 may temporarily store one or more newly incoming access requests (e.g., one or more requests 202) from one or more host CPU 12, host OS 31, and/or chipset 15 in appropriate locations 250A ... 250N in the one or more queues 251. One or more firmware agents 402 may wait until after completion of execution of all outstanding and/or pending access requests that storage 40 may be currently executing. After the completion of the execution of any such outstanding and/or pending access requests, the one or more requests 202 that may have been temporarily stored in one or more queues 251 may be examined by one or more firmware agents 402 to determine whether they may be directed to, at least in part, one or more locked LBA 270A ... 270N. For example, one or more locked LBA 270A ... 270N may have been locked by one or more agents 402 because they may involve, at least in part, (1) one or more protected portions and/or partitions (e.g., of the type described previously) of storage 40, and/or (2) one or more LBA that may be currently being accessed (e.g., by an outstanding and/or pending access request). If a given access request in the lock queue 251 is determined not to involve one or more locked LBA 270A ... 270N, the given access request may be released (e.g., removed) from the queue 251. As new access requests from one or more host CPU 12, host OS 31, and/or chipset 15 are intercepted by the one or more firmware agents 402, they may be examined (at least in part in the above manner) to determine whether they may be directed to, at least in part, one or more locked LBA 270A ... 270N. Any newly intercepted access requests directed to one or more locked LBA 270A ... 270N may be added to and/or remain in the queue 251.

After a given storage access request has been released from the one or more queues 251, the released storage access request may be examined, at least in part, by the one or more firmware agents 402 to determine whether the released storage access request is associated with (e.g., generated by, issued by, and/or originated from), at least in part, one or more unauthorized entities 240. For example, the one or more firmware agents 402 may copy and/or store, at least in part, in local memory 35 (e.g., via one or more direct memory access (DMA) operations) one or more not shown buffers (e.g., write buffers) in system memory 21 that may be pointed to, at least in part, by the released storage access request. The one or more firmware agents 402 examine (e.g., scan) the one or more buffers copied and/or stored, at least in part, in local memory 35 to determine whether these one or more buffers evidences being associated, at least in part, with one or more entities 240 (e.g., by comprising and/or evidencing one or more signatures associated with the one or more entities 240). If the one or more buffers do not evidence being associated, at least in part, with one or more entities 240, the one or more agents 402 may request that one or more drivers 408 write the one or more copied buffers into storage 40 (e.g., in the manner requested by the released access request), one or more drivers 408 may issue one or more corresponding requests 204 to storage 40, and/or one or more agents 402 may indicate to the entity that issued the released access request that the released access request has been executed. Conversely, if the one or more buffers evidence (at least in part) such association, the one or more agents 402 may (1) delete the released access request, (2) indicate to the entity that issued the released access request that the request failed, and/or (3) take action to remedy the presence of unauthorized entity 240.

In another of these locking techniques, after a given access request from one or more host CPU 12, host OS 31, and/or chipset 15 has been intercepted, if the given request is directed to one or more locked LBA 270A ... 270N, the given request and/or the one or more buffers in system memory 21 pointed to by the given request may be copied, at least in part, one or more firmware agents 402 and/or drivers 408 to one or more temporary storage locations (not shown) in one or more protected partitions 206 in storage 40. The given access request may be released if the given access request is not (or is no longer) directed to one or more locked LEA 270A ... 270N. Thereafter, one or more agents 402 and/or drivers 408 may read into memory 35 the given request and/or one or more buffers from these one or more temporary locations in storage 40. One or more agents 402 may examine (e.g., scan) the given request and/or one or more buffers copied and/or stored, at least in part, into local memory 35 to determine whether the given request and/or one or more buffers evidence being associated, at least in part, with one or more entities 240 (e.g., by comprising and/or evidencing one or more signatures associated with the one or more entities 240). If the given request and/or one or more buffers do not evidence being associated, at least in part, with one or more entities 240, the one or more agents 402 may request that one or more drivers 408 write the one or more copied buffers from the protected partition 206 of storage 40 to the one or more locations in storage 40 requested the given access request, one or more drivers 408 may issue one or more corresponding requests 204 to storage 40, and/or one or more agents 402 may indicate to the entity that issued the given access request that the given access request has been executed. Conversely, if the one or more buffers evidence (at least in part) such association, the one or more agents 402 may (1) delete the given access request and/or the one or more buffers from storage 40 and/or memory 35, (2) indicate to the entity that issued the released access request that the request failed, and/or (3) take action to remedy the presence of unauthorized entity 240.

Thus, these locking techniques in this embodiment may permit one or more embedded firmware and/or software agents and/or drivers to implement and/or control one or more LBA locking regimes in which one or more access requests 202 and/or one or more related buffers may be at least temporarily stored in memory 35 and/or one or more protected partitions 206. Advantageously, in this embodiment, after release of a given access request from the lock and/or locking queue, the given access request may be examined (e.g., before actually being committed for execution by the storage 40) to determine whether the given access request is associated, at least in part, with one or more unauthorized entities 240. In this embodiment, if evidence of such association is found, the given access request may be deleted prior to being committed for execution by the storage 40, and/or other actions may be taken to remedy the presence of the one or more unauthorized entities 240.

Alternatively or in addition to the foregoing, without departing from this embodiment, storage 40 may comprise one or more HPA 304 (see FIG. 3), and/or communication with. storage 40 may comply and/or be compatible with Serial AT Attachment (SATA) protocol. These one or more HPA 304 may comply and/or be compatible with, at least in part, ANSI, Information Technology—AT Attachment 8—ATA/ATAPI Command Set (ATA8-ACS), INCITS 452-2009 (hereinafter "ATA8-ACS") and/or other versions of this ANSI standard. The SATA protocol may comply and/or be compatible with, at least in part, Serial ATA International Organization, Serial ATA Revision 3.1, Jul. 18, 2011, and/or other versions SATA protocol. One or more storage processors 36 and/or controllers 28 may be capable of examining (e.g., scanning) for and/or remedying, at least in part, presence and/or one or more effects of corruption in and/or of one or more files in one or more HPA 304.

In this embodiment, in order not to interfere with host I/O operations, such examination and/or remediation activities may be carried out, at least in part, by the one or more storage processors 36 and/or controllers 28 in an opportunistic manner when storage 40 is in an idle condition. For example, when storage 40 currently is idle (e.g., there is no outstanding and/or pending I/O operation awaiting execution by storage 40) and in a relatively higher power state (e.g., a fully powered-up state) relative to a relatively lower power state (e.g., a relatively reduced power state, such as, asleep, hibernation, or powered-off state), one or more storage drivers 302 (see FIG. 3) may indicate, at least in part, such idle condition and/or relatively higher power state to one or more firmware agents 402. In this embodiment, one or more drivers 302 may be comprised and/or resident in one or more OS 31 and/or contents 43 of memory 21. In response, at least in part, to such indication from one or more drivers 302, one or more storage processors 36 and/or controllers 28 (e.g., one or more firmware agents 402 and/or one or more drivers 408) may, perform certain operations, These certain operations may comprise issuing one or more HPA (and/or SATA protocol) commands (e.g., in accordance with ATA8-ACS and/or SATA protocol) 306A . . . 306N. These one or more commands 306A . . . 306N may result, at least in part, in unlocking of the one or more HPA regions 304 to permit one or more storage processors 36 and/or controllers 28 to access the one or more regions 304. After the one or more storage processors 36 and/or controllers 28 have accessed the one or more regions 304, these one or more commands may result, at least in part, in the locking of the one or more regions 304.

Figure 3:
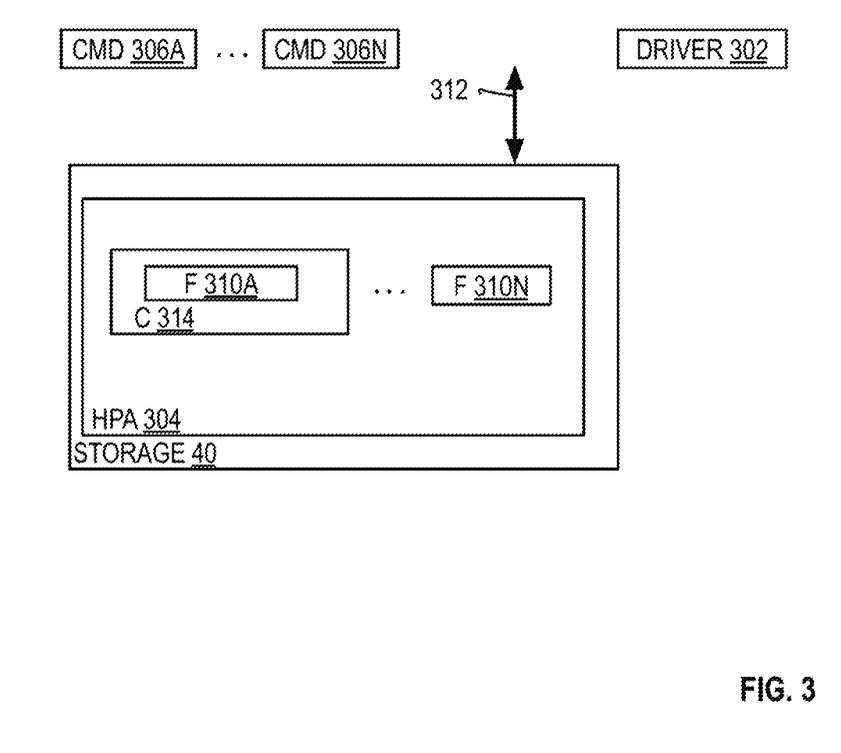
FIG. 3 illustrates elements in an embodiment.

These certain operations may comprise determining whether files 310A . . . 310N in one or more IPA regions 304 are to be examined for possible corruption. For example, one or more agents 402 may be programmed to conduct such examination at and/or after periodic time intervals (e.g., after period time intervals have elapsed). If such a periodic time interval has not yet elapsed, one or more agents 402 may permit the storage 40 to enter the relatively lower power state. Conversely, if such a time period has elapsed, one or more agents 402 (e.g., via and/or using one or more processors 36 and/or controllers 28) may determine, at least in part, whether any files (e.g., any of files 310A . . . 310N) in the one or more regions 304 may be, comprise, and/or have become corrupted and/or remedying any such detected corruption.

For example, one or more agents 402 may issue requests to read files 310A . . . 310N and/or that may permit the one or more processors 36 and/or controllers 28 to take control of the SATA ports (not shown) of the storage 40. Thereafter, one or more agents 402 may issue one or more HPA and/or SATA-related commands (e.g., SETMAX UNLOCK) that may unlock the one or more HPA regions 304 for read access by the one or more agents 402. After reading the files 310A . . . 310N, one or more agents 402 may issue one or more HPA and/or SATA-related commands (e.g., SETMAX LOCK) that may lock the one or more regions 304. The one or more agents 402 may examine (e.g., scan) the files 310A . . . 310N for presence of corruption (e.g., one or more corrupted portions 314). If no such corruption is present in the one or more HPA 304 and/or files 310A . . . 310N, one or more agents 402 may request that control of SATA ports be returned to one or more host CPU 12 and/or OS 31. The one or more agents 402 then may acknowledge the indication provided from the one or more drivers 302; this may permit the one or more drivers 302 to allow the storage 40 to enter and/or to place the storage 40 in the relatively lower power state.

Conversely, if one or more of the files (e.g., one or more files 310A) are corrupted (e.g., is comprised, at least in part, in and/or comprises, at least in part, one or more corrupted portions 314 of one or more regions 304), these certain operations also may comprise informing one or more agents 32 of the (e.g., name or names of the) one or more corrupted files 310A to permit the one or more agents 32 and/or 402 to request an exclusive file lock to prevent host I/O 312 directed to the one or more corrupted files 310A. This may involve the one or more agents 32 calling one or more application program interfaces and/or OS calls. After being granted the exclusive file lock, the one or more agents 32. and/or 402 may unlock, at least with respect to one or more agents 32 and/or 402, the protection associated with the one or more IPA 304 in order to permit the one or more agents 32 and/or 402 to determine the particular nature of the corruption and/or to remedy (e.g., clean, quarantine, delete, and/or correct) the corruption of the one or more corrupted portions 314 and/or files 310A. All operations involving access to the storage 40 may be carried out using and/or via one or more agents 402, processors 36, and/or controllers 28. After remedying the corruption, the one or more regions 304 may again be locked, and the certain operations may include permitting the storage 40 to enter the relatively lower power state.

In this embodiment, the scanning and/or remedying of corruption 314 in one or more HPS 304, and/or all accesses of storage 40, may involve use of one or more agents 402, processors 36, and/or controllers 28. Advantageously, this permits these and/or other operations in accordance with this embodiment to be carried out, at least in part, using embedded hardware and/or one or more embedded firmware agents that may be (at least substantially) impervious to being disabled, impeded, and/or interfered with by one or more entities 240.

Additionally or alternatively, without departing from this embodiment, one or more firmware agents 402 that may be executed, at least in part, by one or more processors 36 and/or controllers 28 may periodically determine, based at least in part upon one or more (and in this embodiment, a plurality of) policies 406A . . . 406N (see FIG. 4) that may be stored, at least in part, in one or more (and in this embodiment, a plurality of) secure locations 404A . . . 404N in storage 40, whether to examine, at least in part, one or more (and in this embodiment, a plurality of) files 412A . . . 412N for possible corruption. If one or more agents 402 determine that the one or files 412A . . . 412N are to be examined, at least in part, then at least one set of operations may be performed. The at least one set of operations may comprise, for example, one or more embedded processes 408 (e.g., executed in and/or by one or more processors 36 and/or controllers 28) issuing one or more read requests to and/or involving, at least in part, one or more blocks 410 in storage 40. The one or more blocks 410 may correspond, at least in part, to the one or more files 412A . . . 412N. The at least one set of operations also may comprise the one or more agents 402 examining, at least in part, the one or more files 412A . . . 412N for possible corruption.

If the one or more agents 402 determine, at least in part, that the corruption (e.g., corruption 416) is present, at least in part, in the one or more files 412A . . . 412N, then at least one other set of operations may be performed. The at least one other set of operations may comprise, for example, the one or more agents 402 locking one or more address ranges (e.g., comprising and/or embodied by, at least in part, LBA ranges 450A . . . 450N) associated, at least in part, with one or more files 412A . . . 412N. This locking may be to prevent one or more host CPU 12, one or more host OS 31, and/or one or more chipsets 15 from being able to access, at least in part, one or more files 412A . . . 412N. The at least one other set of operations also may comprise one or more agents 402 remedying, at least in part, the corruption 416, for example, by overwriting, deleting, and/or quarantining, at least in part, one or more (e.g., 412A) of the files 412A . . . 412N that comprise, at least in part, the detected corruption 416. Additionally, the at least one other set of operation may comprise, after the remedying of the corruption 416 by one or more agents 402, unlocking, at least in part, by the one or more agents 402 the one or more address ranges 450A . . . 450N and/or files 412A . . . 412N.

For example, in this embodiment, one or more secure locations 404A . . . 404N and/or policies 406A . . . 406N may be comprised in, at least in part, one or more partitions 206, information 208, and/or one or more downloads 105. One or more policies 406A . . . 406N may indicate, at least in part, one or more actions for one or more agents 402 to undertake in response at least in part to one or more conditions, occurrences, and/or events. For example, implementation of one or more policies 406A . . . 406N may result in the setting of a periodic timer that when triggered may result in the one or more agents 402 examining (e.g., scanning) one or more subsets of the files 412A . . . 412N in one or more blocks 410 for the presence of possible corruption. One or more policies 406A . . . 406N also may indicate, at least in part, one or more particular types of signatures and/or characteristics of such corruption for which one or more agents 402 is to examine, at least in part, the files 412A . . . 412N, and/or one or more respective types of actions that one or more agents 402 are to take in response, at least in part, to detection of such corruption (e.g., if such signatures and/or characteristics are found), for example, to remedy such corruption.

For each of the files 412A . . . 412N to be examined by one or more agents 402, one or more agents 402 may issue one or more embedded file system calls (e.g., directed to a not shown embedded file system that may be resident in one or more processors 36) that may result in one or more block read requests (e.g., directed to one or more blocks 410) being issued to one or more embedded storage processes/drivers 408. This may result, at least in part, in one or more drivers 408 issuing (e.g., via one or more not shown host bus adapters associated with the one or more drivers 408) one or more corresponding read requests to read one or more blocks 410 and/or one or more LBA ranges 450A . . . 450N. This may result, at least in part, in the one or more blocks 410 and/or LBA ranges 450A . . . 450N being read. The results of the read may be returned to one or more agents 402 (e.g., via one or more drivers 408 and/or the not shown embedded file system). One or more agents 402 may examine, based at least in part upon the one or more policies 406A . . . 406N, the one or more blocks 410, address ranges 450A . . . 450N, and/or files 412A . . . 412N for presence of corruption 416. If no such corruption 416 is detected, one or more agents 402 may reset the tinier and wait until the expiry of the timer to commence with a subsequent examination.

Conversely, if such corruption 416 is detected, one or more agents 402 may obtain (e.g., via querying the not shown embedded file system) the one or more LBA ranges 450A in which the corruption 416 and/or one or more corrupted files 412A may be present. One or more agents 402 may apply one or more locks to these one or more LBA ranges 450A and/or corrupted files 412A that may block subsequent access and/or I/O to (at least) the one or more ranges 450A and/or corrupted files 412A from the one or more host CPU 12, one or more host OS 31, and/or one or more chipsets 15. This may prevent the one or more host CPU 12, one or more host OS 31, and/or one or more chipsets 15 from being able to access, at least in part, one or more files 412A and/or address ranges 450A. Alternatively or additionally, a broader lock may be applied (e.g., to more than the one or more corrupted files 412A and/or address ranges 450A) that may encompass a larger subset of one or more blocks 410, files 412A . . . 412N, and/or LBA ranges 450A . . . 450N.

After applying the lock, one or more agents 402 may issue one or more access requests (e.g., write requests) that may be result in remedying of the corruption 416 (e.g., by overwriting, deleting, and/or quarantining, at least in part, one or more files 412A and/or LBA ranges 450A that may comprise, at least in part, the detected corruption 416). Thereafter, the one or more agents 402 may release the lock.

Advantageously, the above operations of one or more agents 402 (and/or other components of one or more storage processors 36 and/or controllers 28) may be carried out without interference by one or more entities 240, host CPU 12, host OS 31, and/or chipset 15. Also advantageously, these operations may be carried out in parallel with, at least in part, storage access operations initiated by host CPU 12, host OS 31, and/or chipset 15.

In this embodiment, an action or event may be considered to take place periodically if the action or event has at least two occurrences that occur at different times, even if the respective times between successive of such occurrences are not identical and/or regular. In this embodiment, a policy may be or comprise, at least in part, (1) one or more rules, instructions, commands, processes, procedures, permissions, and/or interdictions, and/or (2) one or more goals and/or results that may be achieved and/or intended to be achieved as a result, at least part, of implementing one or more rules, instructions, commands, processes, procedures, permissions, and/or interdictions. Also in this embodiment, enforcement of a policy may comprise, at least in part, implementation and/or execution of (1) one or more rules, instructions, commands, processes, procedures, permissions, and/or interdictions, and/or (2) achievement, at least in part, of one or more goals and/or results.

Thus, an embodiment may comprise a storage processor that may be comprised, at least in part, in a host. The host may comprise at least one host CPU to execute at least one host OS. The storage processor may execute at least one operation in isolation from interference from and control by the at least one host CPU and the at least one host OS. The at least one operation may be to facilitate, at least in part, (1) prevention, at least in part, of unauthorized access to storage, (2) prevention, at least in part, of execution by the at least one host CPU of at least one unauthorized instruction, (3) detection, at least in part, of the at least one unauthorized instruction, and/or (4) remediation, at least in part, of at least one condition associated, at least in part, with the at least unauthorized instruction.

Advantageously, for the reasons, among others, stated above, the storage processor and/or embedded controller (and/or the operations performed by them) of this embodiment may be substantially or entirely impervious to spoofing and/or "man in the middle" attack by malicious programs. Advantageously, this may substantially reduce the possibility of a malicious program being able to carry out its activities without being detected or counteracted in this embodiment. Further advantageously, the storage processor and/or embedded controller of this embodiment may be much more capable of detecting and/or preventing unauthorized access by malicious programs to the host, host system memory, and/or storage.

Further advantageously, in this embodiment, malware detection and recovery information may be stored in locations and/or communicated in ways that are protected and/or secure from access, tampering, modification, and/or interference by malicious programs and/or entities, and/or by host CPU and/or host OS. In this embodiment, this may greatly reduce the possibility that such malicious programs may become resident in the host and/or may avoid detection and removal. Also advantageously, this storage processor and/or embedded controller of this embodiment may be capable of preventing, detecting, and/or remedying presence of such a malicious program in one or more HPA regions in storage. Further advantageously, the storage processor and/or embedded controller of this embodiment may be capable of completely eliminating detected malicious program code from storage, without having to perform a complete wipe of the storage (thereby facilitating user data recovery) and without involving substantial user intervention and/or interaction.

Many alternatives, modifications, and/or variations are possible without departing from this embodiment. Accordingly, the claims are intended to embrace all such alternatives, modifications, and/or variations.

What is claimed is:

1. An apparatus comprising:
a storage processor to be comprised, at least in part, in a host, the host including at least one host central processing unit (CPU) to execute at least one host operating system (OS), the storage processor to execute at least one operation in isolation from interference and control by the at least one host CPU and the at least one host OS, the at least one operation being to facilitate, at least in part, one or more of the following:
prevention, at least in part, of unauthorized access to storage;
prevention, at least in part, of execution by the at least one host CPU of at least one unauthorized instruction;
detection, at least in part, of the at least one unauthorized instruction; and
remediation, at least in part, of at least one condition associated, at least in part, with the at least unauthorized instruction;
wherein:
in response, at least in part, to detection by the storage processor of at least one corrupted partition of the storage, the storage processor is to:
perform at least one network download of at least one current OS recovery image to update at least one previously stored OS recovery image;
establish a boot device based at least in part upon the at least one current OS recovery image; and
issue one or more commands that result in the at least one host CPU rebooting the host based at least in part upon the boot device and the at least one current OS recovery image;
in response, at least in part, to the rebooting, the at least one current OS recovery image is to:
mount, at least in part, the at least one corrupted partition as secondary storage;
determine, at least in part, and remedy, at least in part, at least one source of corruption of the at least one corrupted partition; and
obtain, via at least one other network download, information to facilitate, at least in part, recovery of user data from the at least one corrupted partition.

2. The apparatus of claim 1, wherein:
the storage processor is to intercept attempted access by the at least one host CPU and the at least one host OS to and from the storage;
the storage processor is to establish at least one portion of the storage that is hidden from and inaccessible to both the at least one host CPU and the at least one host OS, the at least one portion being to store information to facilitate, at least in part, the at least one operation.

3. The apparatus of claim 1, wherein:
the storage processor is to intercept and store, at least temporarily, at least one storage access request from least one of the at least one host CPU and the at least one host OS; and
after the at least one storage access request has been stored at least temporarily, the storage processor is to examine, at least in part, the at least one storage access request to make a determination whether to permit the at least one storage access request to proceed to be executed, the determination being based at least in part upon whether the at least one storage access request is associated, at least in part, with:
at least one currently locked address; and
an unauthorized requesting entity.

4. The apparatus of claim 1, wherein:
the storage comprises a host protected area (HPA) region;
in response, at least in part, to an indication that the storage is idle and in a relatively higher power state, the storage processor is to:
issue one or more HPA commands that result, at least in part, in unlocking of the region to permit the storage processor to access the region, and after the storage processor has accessed the region, also result, at least in part, in locking of the region;
determine whether any files in the region are corrupted;
if one or more files in the region are corrupted,
   inform a software agent of the one or more files to permit the software agent to request exclusive file lock to prevent host input/output (I/O) directed to the one or more files;
   unlock the region;
   remedy corruption of the one or more files; and
   relock the region;
permit the storage to enter the relatively lower power state, the relatively lower power state being relatively lower than the relatively higher power state.

5. An apparatus comprising:

a storage processor to be comprised, at least in part, in a host, the host including at least one host central processing unit (CPU) to execute at least one host operating system (OS), the storage processor to execute at least one operation in isolation from interference from and control by the at least one host CPU and the at least one host OS, the at least one operation being to facilitate, at least in part, one or more of the following:
   prevention, at least in part, of unauthorized access to storage;
   prevention, at least in part, of execution by the at least one host CPU of at least one unauthorized instruction;
   detection, at least in part, of the at least one unauthorized instruction; and
   remediation, at least in part, of at least one condition associated, at least in part, with the at least unauthorized instruction;
wherein:
   the storage processor is to execute a firmware agent that is to periodically determine, based at least in part upon one or more policies stored at least in part in one or more secure locations of the storage, whether to examine, at least in part, one or more files in the storage for possible corruption;
   if the firmware agent determines that the one or more files are to be examined, at least in part:
      at least one embedded process in the storage processor is to issue at least one read request to at least one block of the storage, the at least one block corresponding, at least in part, to the one or more files; and
      the firmware agent is to examine, at least in part, the one or more files for the possible corruption; and
   if the firmware agent determines, at least in part, that the corruption is present, at least in part, in the one or more files:
      the firmware agent is to lock at least one address range associated with the one or more files to prevent the at least one host CPU and the at least one host 0/S from accessing the one or more files;
      the firmware agent is to remedy the corruption by overwriting, at least in part, the one or more files in the storage; and
      after remedying the corruption, the firmware agent is to unlock the at least one address range.

6. The apparatus of claim 5, wherein:
the host also comprises a circuit board that comprises the at least one host CPU and host system memory in which the at least one host OS is to reside;
a circuit card comprises the storage processor;
the circuit card is to be coupled to the circuit board;
the storage processor comprises an embedded controller, a network interface, and local memory; and
the embedded controller is to execute one or more instructions stored in the local memory that result, at least in part, in the embedded controller communicating with another host via the network interface to facilitate, at least in part, the at least one operation, the communicating being in a manner that is isolated from host CPU network traffic and host OS traffic.

7. The apparatus of claim 5, wherein:
the at least one operation comprises examining, at least in part, contents of memory of the host to detect, at least in part, the at least one unauthorized instruction;
the contents comprises, at least in part, the at least one host OS and basic input/output system (BIOS) settings.

8. The apparatus of claim 5, wherein:
the storage processor is to establish, at least in part, at least one secure communication channel with an agent, the at least one secure communication channel being to permit trusted command and data exchange to be carried out between the agent and the storage processor, the exchange being related to at least one storage operation to be carried out, at least in part, by the storage.

9. A method comprising:

executing, at least in part, by a storage processor at least one operation, the storage processor to be comprised, at least in part, in a host, the host including at least one host central processing unit (CPU) to execute at least one host operating system (OS), the at least one operation being executed, at least in part, in isolation from interference from and control by the at least one host CPU and the at least one host OS, the at least one operation being to facilitate, at least in part, one or more of the following:
   prevention, at least in part, of unauthorized access to storage;
   prevention, at least in part, of execution by the at least one host CPU of at least one unauthorized instruction;
   detection, at least in part, of the at least one unauthorized instruction; and
   remediation, at least in part, of at least one condition associated, at least in part, with the at least unauthorized instruction;
wherein:
   in response, at least in part, to detection by the storage processor of at least one corrupted partition of the storage, the storage processor is to:
      perform at least one network download of at least one current OS recovery image to update at least one previously stored OS recovery image;
      establish a boot device based at least in part upon the at least one current OS recovery image; and
      issue one or more commands that result in the at least one host CPU rebooting the host based at least in part upon the boot device and the at least one current OS recovery image;
   in response, at least in part, to the rebooting, the at least one current OS recovery image is to:
      mount, at least in part, the at least one corrupted partition as secondary storage;
      determine, at least in part, and remedy, at least in part, at least one source of corruption of the at least one corrupted partition; and
      obtain, via at least one other network download, information to facilitate, at least in part, recovery of user data from the at least one corrupted partition.

10. The method of claim 9, wherein:
the host also comprises a circuit board that comprises the at least one host CPU and host system memory in which the at least one host OS is to reside;
a circuit card comprises the storage processor;
the circuit card is to be coupled to the circuit board;
the storage processor comprises an embedded controller, a network interface, and local memory; and
the embedded controller is to execute one or more instructions stored in the local memory that result, at least in part, in the embedded controller communicating with another host via the network interface to facilitate, at least in part, the at least one operation, the communicating being in a manner that is isolated from host CPU network traffic and host OS traffic.

11. The method of claim 9, wherein:
the at least one operation comprises examining, at least in part, contents of memory of the host to detect, at least in part, the at least one unauthorized instruction;
the contents comprises, at least in part, the at least one host OS and basic input/output system (BIOS) settings.

12. The method of claim 9, wherein:
the storage processor is to intercept attempted access by the at least one host CPU and the at least one host OS to and from the storage;
the storage processor is to establish at least one portion of the storage that is hidden from and inaccessible to both the at least one host CPU and the at least one host OS, the at least one portion being to store information to facilitate, at least in part, the at least one operation.

13. The method of claim 9, wherein:
the storage processor is to establish, at least in part, at least one secure communication channel with an agent, the at least one secure communication channel being to permit trusted command and data exchange to be carried out between the agent and the storage processor, the exchange being related to at least one storage operation to be carried out, at least in part, by the storage.

14. The method of claim 9, wherein:
the storage processor is to intercept and store, at least temporarily, at least one storage access request from least one of the at least one host CPU and the at least one host OS; and
after the at least one storage access request has been stored at least temporarily, the storage processor is to examine, at least in part, the at least one storage access request to make a determination whether to permit the at least one storage access request to proceed to be executed, the determination being based at least in part upon whether the at least one storage access request is associated, at least in part, with:
at least one currently locked address; and
an unauthorized requesting entity.

15. Computer-readable memory storing one or more instructions that when executed by a machine result in performance of operations comprising:
executing, at least in part, by a storage processor at least one operation, the storage processor to be comprised, at least in part, in a host, the host including at least one host central processing unit (CPU) to execute at least one host operating system (OS), the at least one operation being executed, at least in part, in isolation from interference from and control by the at least one host CPU and the at least one host OS, the at least one operation being to facilitate, at least in part, one or more of the following:
prevention, at least in part, of unauthorized access to storage;
prevention, at least in part, of execution by the at least one host CPU of at least one unauthorized instruction;
detection, at least in part, of the at least one unauthorized instruction; and
remediation, at least in part, of at least one condition associated, at least in part, with the at least unauthorized instruction;
wherein:
in response, at least in part, to detection by the storage processor of at least one corrupted partition of the storage, the storage processor is to:
perform at least one network download of at least one current OS recovery image to update at least one previously stored OS recovery image;
establish a boot device based at least in part upon the at least one current OS recovery image; and
issue one or more commands that result in the at least one host CPU rebooting the host based at least in part upon the boot device and the at least one current OS recovery image;
in response, at least in part, to the rebooting, the at least one current OS recovery image is to:
mount, at least in part, the at least one corrupted partition as secondary storage;
determine, at least in part, and remedy, at least in part, at least one source of corruption of the at least one corrupted partition; and
obtain, via at least one other network download, information to facilitate, at least in part, recovery of user data from the at least one corrupted partition.

16. The computer-readable memory of claim 15, wherein:
the storage processor is to intercept attempted access by the at least one host CPU and the at least one host OS to and from the storage;
the storage processor is to establish at least one portion of the storage that is hidden from and inaccessible to both the at least one host CPU and the at least one host OS, the at least one portion being to store information to facilitate, at least in part, the at least one operation.

17. The computer-readable memory of claim 15, wherein:
the storage processor is to intercept and store, at least temporarily, at least one storage access request from least one of the at least one host CPU and the at least one host OS; and
after the at least one storage access request has been stored at least temporarily, the storage processor is to examine, at least in part, the at least one storage access request to make a determination whether to permit the at least one storage access request to proceed to be executed, the determination being based at least in part upon whether the at least one storage access request is associated, at least in part, with:
at least one currently locked address; and
an unauthorized requesting entity.

18. The computer-readable memory of claim 15, wherein:
the storage comprises a host protected area (HPA) region;
in response, at least in part, to an indication that the storage is idle and in a relatively higher power state, the storage processor is to:
issue one or more HPA commands that result, at least in part, in unlocking of the region to permit the storage processor to access the region, and after the storage processor has accessed the region, also result, at least in part, in locking of the region;
determine whether any files in the region are corrupted;
if one or more files in the region are corrupted, inform a software agent of the one or more files to permit the software agent to request exclusive file lock to prevent host input/output (I/O) directed to the one or more files;
unlock the region;
remedy corruption of the one or more files; and
relock the region;
permit the storage to enter a relatively lower power state, the relatively lower power state being relatively lower than the relatively higher power state.

19. Computer-readable memory storing one or more instructions that when executed by a machine result in performance of operations comprising:
executing, at least in part, by a storage processor at least one operation, the storage processor to be comprised, at least in part, in a host, the host including at least one host central processing unit (CPU) to execute at least one host operating system (OS), the at least one operation being executed, at least in part, in isolation from interference from and control by the at least one host CPU and the at least one host OS, the at least one operation being to facilitate, at least in part, one or more of the following:
prevention, at least in part, of unauthorized access to storage;
prevention, at least in part, of execution by the at least one host CPU of at least one unauthorized instruction;
detection, at least in part, of the at least one unauthorized instruction; and
remediation, at least in part, of at least one condition associated, at least in part, with the at least unauthorized instruction;
wherein:
the storage processor is to execute a firmware agent that is to periodically determine, based at least in part upon one or more policies stored at least in part in one or more secure locations of the storage, whether to examine, at least in part, one or more files in the storage for possible corruption;
if the firmware agent determines that the one or more files are to be examined, at least in part:
at least one embedded process in the storage processor is to issue at least one read request to at least one block of the storage, the at least one block corresponding, at least in part, to the one or more files; and the firmware agent is to examine, at least in part, the one or more files for the possible corruption; and
if the firmware agent determines, at least in part, that the corruption is present, at least in part, in the one or more files:
the firmware agent is to lock at least one address range associated with the one or more files to prevent the at least one host CPU and the at least one host 0/S from accessing the one or more files;
the firmware agent is to remedy the corruption by overwriting, at least in part, the one or more files in the storage; and
after remedying the corruption, the firmware agent is to unlock the at least one address range.

20. The computer-readable memory of claim 19, wherein:
the host also comprises a circuit board that comprises the at least one host CPU and host system memory in which the at least one host OS is to reside;
a circuit card comprises the storage processor;
the circuit card is to be coupled to the circuit board;
the storage processor comprises an embedded controller, a network interface, and local memory; and
the embedded controller is to execute one or more instructions stored in the local memory that result, at least in part, in the embedded controller communicating with another host via the network interface to facilitate, at least in part, the at least one operation, the communicating being in a manner that is isolated from host CPU network traffic and host OS traffic.

21. The computer-readable memory of claim 19, wherein:
the at least one operation comprises examining, at least in part, contents of memory of the host to detect, at least in part, the at least one unauthorized instruction;
the contents comprises, at least in part, the at least one host OS and basic input/output system (BIOS) settings.

22. The computer-readable memory of claim 19, wherein:
the storage processor is to establish, at least in part, at least one secure communication channel with an agent, the at least one secure communication channel being to permit trusted command and data exchange to be carried out between the agent and the storage processor, the exchange being related to at least one storage operation to be carried out, at least in part, by the storage.

* * * * *